T. H. HUGHES.
TRAP SPRING.
APPLICATION FILED JUNE 8, 1912.
1,048,075.
Patented Dec. 24, 1912.
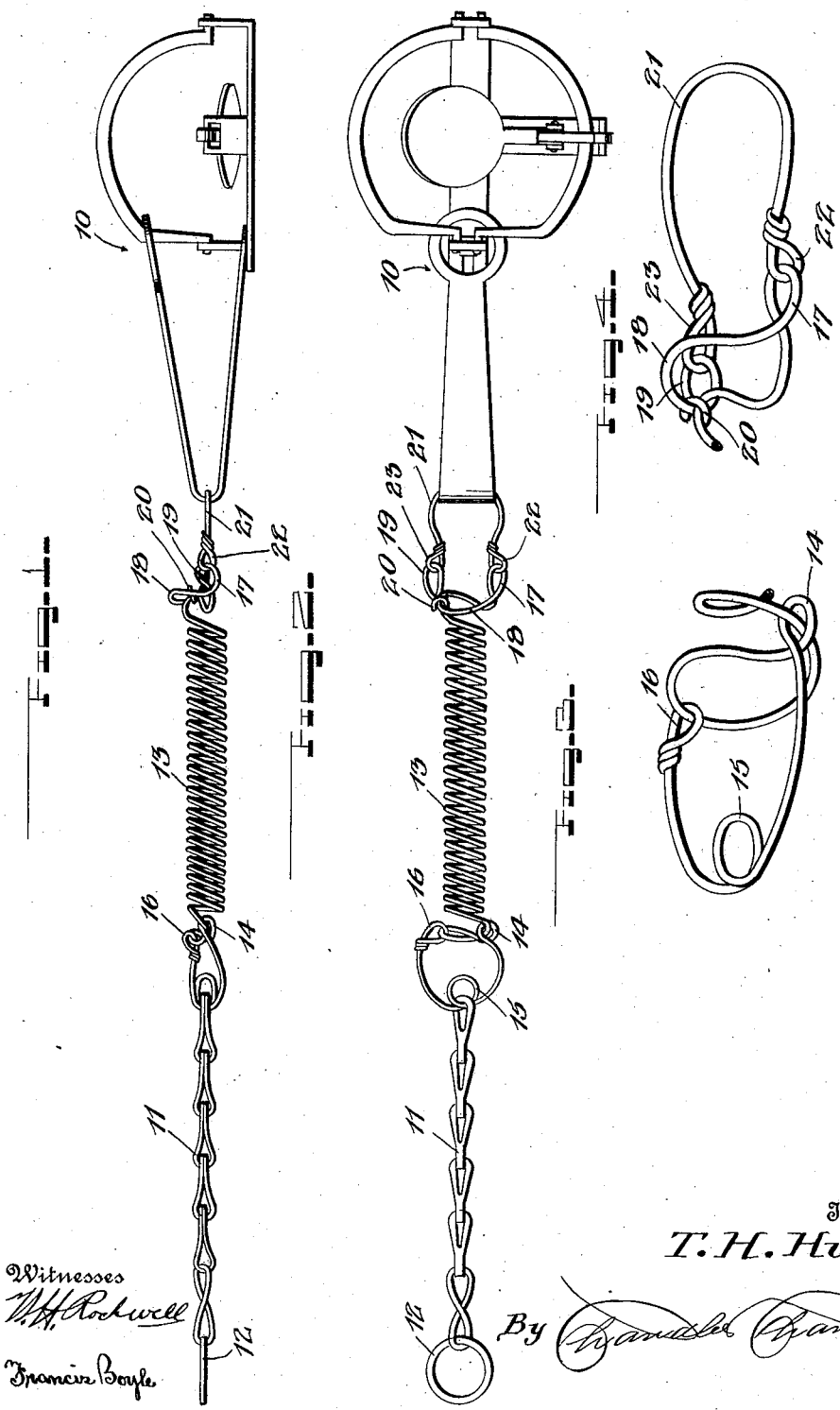
Witnesses
W. H. Rockwell
Francis Boyle
Inventor
T. H. Hughes
By
Attorneys

UNITED STATES PATENT OFFICE.

THOMAS HOUSTON HUGHES, OF WEST POINT, TENNESSEE.

TRAP-SPRING.

1,048,075.   Specification of Letters Patent.   Patented Dec. 24, 1912.

Application filed June 8, 1912. Serial No. 702,469.

*To all whom it may concern:*

Be it known that I, THOMAS H. HUGHES, a citizen of the United States, residing at West Point, in the county of Lawrence, State of Tennessee, have invented certain new and useful Improvements in Trap-Springs; and I do hereby declare the following to be a full, clear, and exact description of the invention, such as will enable others skilled in the art to which it appertains to make and use the same.

This invention relates to traps and has for an object to provide a tether for the trap having a helical spring attached at one end to the trap and at the opposite end to the trap anchoring chain, the spring yielding during the efforts of the entrapped animal to escape so that sharp tugs upon the bush or the like to which the chain is secured with consequent breaking of the bush and loss of the animal and trap is obviated.

A further object of the invention is to provide a helical spring having novel terminals for engaging the trap and the chain.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a side elevation of the trap and tether. Fig. 2 is a plan view of an ordinary rat trap equipped with my improved tether. Fig. 3 is a detail perspective view of one terminal of the spring. Fig. 4 is a detail perspective view of the other terminal of the spring.

Referring now to the drawing in which like characters of reference designate similar parts, 10 designates an ordinary rat trap and 11 the tether chain thereof, the chain being terminally equipped with a securing ring 12 designed to be attached to a bush or the like for anchoring the trap.

A helical spring 13 is terminally connected to the terminal link of the chain most remote from the securing ring and is terminally connected to the trap, this chain forming a yielding section of the tether and serving to cushion the chain against sharp pulls upon the entrapped animal struggling to escape.

For attaching one end of the spring to the chain, the terminal spiral of the chain is directed to form an eye 14 which encircles the next adjacent spiral or convolution, the wire then being directed forwardly and looped upon itself as shown at 15 to form an eye which interlocks with the terminal link of the chain, the wire finally being directed rearwardly and looped upon itself to form an eye 16 which encircles the terminal convolution of the spring diametrically opposite the first named eye 14, this construction forming an integral securing means on the spring for attaching one end of the spring to the confronting end of the chain.

For attaching the spring to the trap the terminal convolution at the other end of the spring is directed forwardly and looped upon itself to form an eye 17, the wire being then arched upwardly as shown at 18 and then again directed forwardly in the plane of the first named eye 17 to form an eye 19, the free end of the wire being finally wrapped about the arched portion 18 and terminal convolution as shown at 20. A separate bowed length of wire 21 is engaged through the leaf spring of the trap and both terminals of this wire are terminally looped upon themselves to form eyes 22 and 23 which interlock with the eyes 17 and 19 of the spring.

It will thus be seen that the spring section of the tether is terminally equipped with means for engaging with the trap and with the chain section, this means being so constructed as to be strong and durable and to dispense with all swivel joints and the like which might tend to promote rigidity of the spring.

What is claimed, is:—

The combination with a trap of a tether including a flexible section, and a helical spring secured at one end to said flexible section and forming a continuation thereof, the opposite end of said spring having the terminal convolution directed forwardly to form an eye, thence arched outwardly and terminally again directed forwardly to form a second eye, the extreme end of the wire being wrapped about said arched portion and said terminal convolution, and a bowed length of wire passed through said trap and terminally equipped with eyes which engage both above named eyes.

In testimony whereof, I affix my signature, in presence of two witnesses.

TOM. HOUSTON HUGHES.

Witnesses:
W. I. INMAN,
R. S. HEDLES.

Copies of this patent may be obtained for five cents each, by addressing the "Commissioner of Patents, Washington, D. C."